US009272687B2

(12) United States Patent
Lanter

(10) Patent No.: US 9,272,687 B2
(45) Date of Patent: Mar. 1, 2016

(54) CIRCUIT ARRANGEMENT FOR A BELT LOCK

(75) Inventor: Joshua Lanter, Chur (CH)

(73) Assignee: POLYCONTACT AG, Chur (CH)

( * ) Notice: Subject to any disclaimer, the term of this patent is extended or adjusted under 35 U.S.C. 154(b) by 695 days.

(21) Appl. No.: 13/356,973

(22) Filed: Jan. 24, 2012

(65) Prior Publication Data
US 2012/0188070 A1 Jul. 26, 2012

(30) Foreign Application Priority Data

Jan. 24, 2011 (CH) .......................................... 114/11

(51) Int. Cl.
B60Q 1/00 (2006.01)
B60R 22/48 (2006.01)
H01H 1/26 (2006.01)
H01H 27/00 (2006.01)

(52) U.S. Cl.
CPC .......... B60R 22/48 (2013.01); B60R 2022/4816 (2013.01); H01H 1/26 (2013.01); H01H 27/00 (2013.01)

(58) Field of Classification Search
CPC .. B60R 22/48; B60R 2022/4816; H01H 1/26; H01H 27/00
USPC ............................................. 340/384.1, 457.1
See application file for complete search history.

(56) References Cited

U.S. PATENT DOCUMENTS

| 3,781,497 | A | * | 12/1973 | Stephenson | B60R 22/48 200/16 B |
| 4,001,532 | A | * | 1/1977 | Kubota et al. | 200/61.58 B |
| 4,228,567 | A | * | 10/1980 | Ikesue | A44B 11/2511 24/642 |
| 4,265,988 | A | * | 5/1981 | Kessels | C09J 7/0296 428/323 |
| 4,404,538 | A | * | 9/1983 | Mori | 337/336 |
| 4,506,122 | A | * | 3/1985 | Miyata | G11B 15/07 200/287 |
| 4,566,161 | A | * | 1/1986 | Ashworth | A44B 11/2511 24/639 |
| 5,041,056 | A | * | 8/1991 | Hutton | 452/171 |
| 5,195,224 | A | * | 3/1993 | Bock et al. | 24/641 |
| 5,919,056 | A | * | 7/1999 | Suzuki et al. | 439/352 |
| 5,966,784 | A | * | 10/1999 | Arbogast et al. | 24/633 |
| 6,002,325 | A | * | 12/1999 | Conaway | 340/384.1 |
| 6,082,481 | A | * | 7/2000 | Engler | 180/268 |
| 6,357,091 | B1 | * | 3/2002 | Devereaux | 24/633 |
| 6,851,713 | B2 | * | 2/2005 | Mattes et al. | 280/801.1 |
| 7,296,825 | B1 | * | 11/2007 | Zia et al. | 280/801.1 |

(Continued)

FOREIGN PATENT DOCUMENTS

EP 0 861 763 A2 9/1998
EP 1 485 276 B1 8/2006

Primary Examiner — Quang D Pham
(74) Attorney, Agent, or Firm — Buchanan Ingersoll & Rooney PC

(57) ABSTRACT

An exemplary circuit arrangement for a belt lock of a passenger restraint system in motor vehicles includes one contact sheet pair having a fixed contact sheet and an elastic contact sheet which interacts with a slide. The slide is a component of a locking mechanism located in a belt lock housing for an inserted belt tongue, and is pushed in a displacement channel from a first end position into a second end position when the locking mechanism is actuated. The contact sheet pair is in a housing part which borders the displacement channel. A part, which projects from the elastic contact sheet through a housing wall opening into the displacement channel, is exposed to the action of the slide to open or close an electrical contact to the contact sheet. The circuit includes means for preventing abraded matter from traveling into the contact region of the contact sheet pair.

6 Claims, 4 Drawing Sheets

(56) References Cited

U.S. PATENT DOCUMENTS

| | | | |
|---|---|---|---|
| 7,569,783 B2* | 8/2009 | Burger et al. | 200/243 |
| 2003/0085784 A1* | 5/2003 | Weber | 335/129 |
| 2003/0146078 A1* | 8/2003 | Yoshida | H01H 1/50 200/61.45 R |
| 2003/0226835 A1* | 12/2003 | Bell et al. | 219/121.78 |
| 2005/0146420 A1* | 7/2005 | Ebert | 340/384.1 |
| 2008/0063936 A1* | 3/2008 | Hansen | H01M 2/08 429/185 |
| 2009/0217620 A1* | 9/2009 | Perkins et al. | 53/79 |
| 2010/0102906 A1* | 4/2010 | Lanter | B60R 22/48 335/205 |
| 2011/0080279 A1* | 4/2011 | Lanter | B60R 22/48 340/457.1 |
| 2011/0094067 A1* | 4/2011 | Lombriser | B60R 22/48 24/166 |
| 2011/0114459 A1* | 5/2011 | Lanter | B60R 22/48 200/61.58 B |
| 2012/0228108 A1* | 9/2012 | Kawaguchi | H01H 1/26 200/535 |
| 2012/0310483 A1* | 12/2012 | Lanter | 701/45 |
| 2012/0318646 A1* | 12/2012 | Lanter et al. | 200/61.58 B |

* cited by examiner

CIRCUIT ARRANGEMENT FOR A BELT LOCK

RELATED APPLICATION

This application claims priority under 35 U.S.C. §119 to Swiss Patent Application No. 00114/11 filed in Switzerland on Jan. 24, 2011, the entire content of which is hereby incorporated by reference in its entirety.

FIELD

The disclosure relates to passenger restraint system, such as a circuit arrangement for a belt lock of a passenger restraint system in motor vehicles.

BACKGROUND INFORMATION

In passenger restraint systems of automobiles, for example, proper operation of safety devices such as front, knee, side or head airbags, specifies that a passenger restraint system provided in the vehicle be used by a passenger, and when in use it is also properly locked. Otherwise, the safety apparatus, especially airbag apparatus, in case of collision could even lead to injuries of the affected passenger. Therefore various known devices are used with which the locking state of a tongue of a safety belt inserted into a belt lock can be checked. For example, signals can be generated from the knowledge of the locking state of the belt lock in order to notify the passengers to put on and fasten the safety belt by a signal. Since the introduction of airbag apparatus, information about the locking state of the safety belt systems is also important for activation or deactivation of mechanisms for inflating driver and passenger airbags and knee, side, and head airbags.

To ascertain the locking state of a belt lock known systems propose contactless systems which can be mechanically activated. For example Hall sensors are can be used for contactless monitoring of components which change their position, especially which can assume two different end positions. Hall sensors in principle comprise (e.g., consist of) a semiconductor layer supplied with constant current, in a known integrated construction. The constant current can be influenced by a magnetic field component perpendicular to the semiconductor layer and the sensor delivers a Hall voltage which can be evaluated, which can be tapped and can be used for evaluating a state and also directly as switching voltage. The integrated construction of Hall sensors allows integration of an evaluation circuit which is suitable for evaluating the operating state on the Hall sensor. In the automobile industry therefore Hall sensors are used as contactless state sensors in many applications.

EP-A-0 861 763, for example, discloses a belt lock with an integrated, biased Hall sensor which detects, without contact, the state of a locking body or an ejector for a lock tongue which has been inserted into a belt lock. Here a Hall sensor with a Hall field is located in direct proximity to a permanent magnet. By changing the location of the locking body or of the ejector which for this purpose comprises (e.g., consists of) a ferromagnetic material, the magnetic field of the permanent magnet is changed. Here the signal of the Hall sensor changes and at the output of the Hall sensor the state change can be tapped as a voltage change. In one alternative version it is suggested that the Hall sensor with a Hall field be installed without a permanent magnet and for this purpose the locking body or the ejector be made as permanent magnets. In this arrangement, the change of the position of the locking body or of the ejector should be detectable by a change of the Hall voltage.

The disadvantage in the belt lock design of EP-A-0 861 763 is that the Hall sensor must be positioned very carefully with respect to the locking element or the ejector. Subsequent installation of the Hall sensor is therefore relatively complex and expensive. Depending on its arrangement, the Hall sensor can also be sensitive to stray external magnetic fields which can be caused for example by a magnetic key chain. Optionally even additional shielding must be mounted; this makes mounting or installation even more complicated. The susceptibility to stray external fields is also increased by the signal changes due to the comparatively short distances which are traversed when closing or opening the safety belt lock by the locking body or the ejector being relatively small. The belt lock version without biased Hall sensor, in which either the locking body or the ejector are made as a permanent magnet, is less practicable. The attainable signal changes are also relatively small here; this makes detection of different states difficult, here belt lock open or closed. With time the permanent magnet can be demagnetized due to vibrations of the locking body and of the ejector when the safety belt is open or closed. This can ultimately lead to the Hall sensor becoming ineffective and the state changes of the belt lock no longer being able to be reliably detected.

The known belt locks all have a very compact construction. The space available within the belt lock is therefore generally very limited. This makes it difficult to arrange the sensor components within the belt lock housing, especially in the vicinity of a component which when the belt lock is activated changes its position from one end position into the other end position. Then if shields are also to be mounted, the designer is generally faced with an essentially insoluble problem since the dimensions of the belt lock housing are not to be changed.

In EP-B-1 485 276 a belt lock is described in which the locking state can be checked by a switch which can be mechanically actuated. The switch comprises (e.g., consists of) a fixed contact sheet and a contact sheet which is made as a spring contact and which projects through an opening in one housing wall into the displacement path of a slide which can be moved into two end positions. The slide in the case of locking presses against a middle bent knee region of the spring contact, as a result of which one contact end made in the shape of a hammer comes into contact with the fixed contact sheet. The grinding contact of the slide with the elbow region of the spring contact causes abraded matter which can travel through the opening of the housing wall into the contact region of the contact end and of the fixed contact sheet. This can cause disruptions or in the worst case prevention of the electrical contact in the case of locking. This can even lead to faulty interpretations of the locking state and to misoperations in the following systems, especially the controls of the safety apparatus, such as front, knee, side and/or head airbags.

SUMMARY

An exemplary circuit arrangement for a belt lock of a passenger restraint system in motor vehicles is disclosed, comprising: a contact sheet pair having a fixed contact sheet and an elastic contact sheet which interacts when moved with a slide which is a component of a locking mechanism located in a belt lock housing for an inserted belt tongue and when the locking mechanism is actuated can be pushed in a displacement channel from a first end position into a second end position, wherein the contact sheet pair is located in a housing part which borders the displacement channel; a part which projects from the elastic contact sheet through an opening in a common housing wall into the displacement channel, depending on a position of the slide, being exposed to an action of the slide in order to open or close an electrical contact to the fixed contact sheet; and means for preventing abraded matter, which is formed when the slide is moved, from traveling into a contact region of the contact sheet pair.

An exemplary circuit arrangement for a belt lock of a passenger restraint system in motor vehicles is disclosed, comprising: a contact sheet pair having a fixed contact sheet and an elastic contact sheet which interacts when moved with a slide which is a component of a locking mechanism located in a belt lock housing for an inserted belt tongue and when the locking mechanism is actuated can be pushed in a displacement channel from a first end position into a second end position, wherein the contact sheet pair is located in a housing part which borders the displacement channel; a part which projects from the elastic contact sheet through an opening in a common housing wall into the displacement channel, depending on a position of the slide, being exposed to action of the slide in order to open or close an electrical contact to the fixed contact sheet; means for preventing abraded matter, which is formed when the slide is moved, from traveling into the contact region of the contact sheet pair; and means for generating an optical and/or acoustic alert signal.

An exemplary circuit arrangement for a belt lock of a passenger restraint system in motor vehicles is disclosed, comprising: a contact sheet pair having a fixed contact sheet and an elastic contact sheet which interacts when moved with a slide which is a component of a locking mechanism located in a belt lock housing for an inserted belt tongue and when the locking mechanism is actuated can be pushed in a displacement channel from a first end position into a second end position, wherein the contact sheet pair is located in a housing part which borders the displacement channel; a part which projects from the elastic contact sheet through an opening in a common housing wall into the displacement channel, depending on a position of a slide, being exposed to action of the slide in order to open or close an electrical contact to the fixed contact sheet; means for preventing abraded matter, which is formed when the slide is moved, from traveling into the contact region of the contact sheet pair; and means actuators or deactivating mechanisms for inflating airbags for the passengers of an automobile.

BRIEF DESCRIPTION OF THE DRAWINGS

Other advantages and features of the disclosed embodiments will become apparent from the following description of schematics of exemplary embodiments of the device.

DETAILED DESCRIPTION

Figure 1:
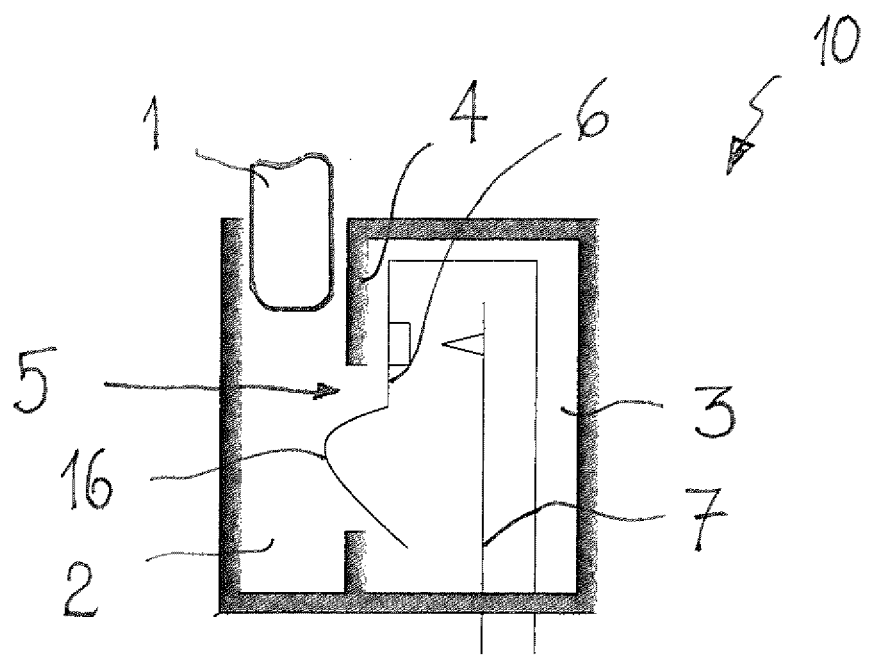
FIG. 1 shows a first circuit arrangement which is a make contact in accordance with an exemplary embodiment.

The exemplary embodiments of the present disclosure are directed to correcting the illustrated problems of circuit arrangements of known systems for belt locks. Contact faults of the circuit arrangement and resulting misinterpretations of the locking state of the belt lock will be prevented. Here the circuit arrangement will be made simple and economical. It will be possible to avoid modifications especially of the size of the belt lock housing.

The disclosed embodiments provide a circuit arrangement for a belt lock of a passenger restraint system in motor vehicles with one contact sheet pair comprising (e.g., consisting of) a fixed contact sheet and an elastic contact sheet which interacts with a slide when moved. The slide is a component of a locking mechanism which is located in a belt lock housing for an inserted belt tongue and when the locking mechanism is actuated is pushed in a displacement channel from a first end position into a second end position. The contact sheet pair is located largely in a housing part which borders the displacement channel. A part which projects from the elastic contact sheet through an opening in a common housing wall into the displacement channel, depending on the position of the slide, is exposed to the action of the latter in order to open or close an electrical contact to the fixed contact sheet. Furthermore there are means which prevent abraded matter which is formed when the slide is moved from traveling into the contact region of the contact sheet pair.

By the circuit arrangement being provided with means which prevent abraded matter from traveling into the contact region of the contact sheet pair, contact faults and the resulting misinterpretations of the locking state of the belt lock are reliably prevented. The additional means are made such that they are compatible with existing belt locks and in particular the size of the belt lock housing need not be changed. The means are simple and economical in engineering and optionally allows even retrofitting of existing belt lock systems.

An exemplary circuit arrangement of the present disclosure includes a cover for the opening in the common housing wall of the displacement channel and of the housing part which holds the contact sheet pair. A cover for the opening in the housing wall for the housing part which holds the contact sheet pair can be prepared very easily, economically and in a space-saving manner.

For example the elastic contact sheet itself forms the cover for the opening. By the elastic contact sheet itself forming the cover for the opening, no additional components are necessary for the circuit arrangement. The basic principle of the contact sheet pair of the circuit arrangement which can be made as a make contact or break contact is retained.

By the part which projects into the displacement channel through the opening being embedded in the opening region in an elastic membrane the length and width dimensions of the elastic contact sheet located directly behind the opening can also be much smaller than that of the opening. The latter is covered by the membrane.

The part which projects into the displacement channel through the opening in another exemplary embodiment of the present disclosure is a section of the elastic contact sheet which is curved in an elbow shape. In this way the elastic contact sheet itself forms an actuating member which interacts with the slide.

In an exemplary embodiment of the present disclosure the part which projects into the displacement channel through the opening is an actuating member which is connected to the elastic contact sheet which extends substantially parallel to the fixed contact sheet. This embodiment has the advantage that the elastic contact sheet need not be bent in shape, and relatively narrow tolerances can be maintained. Rather the elastic contact sheet can be made as a straight component.

The actuating member which projects away from the elastic contact sheet into the displacement channel is for example a plastic block which is provided with a slide coating at least in the interaction region with the slide. To reduce the mass which can be actuated by the slide the plastic block can also be made hollow at least in regions. To reduce the friction forces which occur in the interaction of the actuating member with the slide the actuating member can be arranged tilted in the direction of the oncoming slide.

Another exemplary circuit arrangement of the present disclosure provides for the part which projects into the displacement channel through the opening to be covered with an elastic cover membrane on the side of the common housing wall which is included in the displacement channel. The part which projects into the displacement channel can in turn be a section of the elastic contact sheet bent into an elbow shape or an actuating member which is connected to the elastic contact sheet, for example a projecting plastic block. The elastic cover membrane completely covers the opening in the common housing wall so that any abraded matter cannot travel into the region of the electrical contacts of the contact sheet pair. This exemplary embodiment is especially well suited for simple retrofitting and modification of existing circuit arrangements.

To improve the sliding properties, the elastic cover membrane can be provided with a slide coating, such as a teflon coating, for example, on its side facing the slide.

In an exemplary embodiment, the circuit arrangement can be provided alternatively or cumulatively to a covering of the opening in the common housing wall, the means which prevent abraded matter which forms when the slide is moved from traveling into the contact region of the contact sheet pair are surfaces which bind and hold the abraded matter in the displacement channel and/or in the bordering housing part and/or on the contact sheet pair. The surfaces which are made accordingly collect any abraded matter and provide for frictionless operation of the circuit arrangement. They do not specify any additional space and therefore can be very easily integrated into existing belt lock designs and housings. In one very simple version of the exemplary embodiments disclosed herein the surfaces which bind and hold the abraded matter are adhesive surfaces. For example, adhesive films are mounted in the displacement channel or in the housing part which holds the contact sheet pair or on the contact sheets themselves.

In another exemplary circuit arrangement of the present disclosure, which can be provided alternatively or cumulatively to a covering of the opening in the common housing wall and/or to the surfaces which bind and hold the abraded matter, the means which prevent abraded matter which forms when the slide is moved from traveling into the contact region of the contact sheet pair are geometrical executions of the part which projects into the displacement channel and/or of the slide. The geometrical execution can be optimized with respect to controlled holding of abraded matter or also to prevent abraded matter. For example, for this purpose the part which projects into the displacement channel is provided with a central flattening or bead such that in the mechanical interaction with the slide the abraded matter can be minimized.

The part which projects into the displacement channel can in turn be a section of the elastic contact sheet curved into an elbow shape or an actuating member which is connected to the elastic contact sheet, for example a projecting plastic block. The achievement of the initially described objects by the geometrical shaping of the interacting components which cause abrasion does not specify additional elements. Nor in general does it specify any additional space and therefore can be integrated very easily and advantageously into existing belt lock designs.

It should be understood that the exemplary circuit arrangements described herein can be made as a make contact in which an electric contact is closed when the slide interacts with the part which projects into the displacement channel, or as a break contact in which an electric contact is opened when the slide interacts with the part which projects into the displacement channel.

One feasible application of an exemplary belt lock equipped with a circuit arrangement of the present disclosure is to generate an optical and/or acoustic alert signal for the passenger, for example of an automobile, to fasten safety belts. Further the belt lock equipped of the present disclosure can also be used for the activation or deactivation of mechanisms for inflating airbags for the passengers of an automobile. For one skilled in the art a host of other possible applications are enabled which would exceed the scope of this application to enumerate them all.

FIGS. 1-8 each show one segment of a belt lock housing in a section which includes a displacement channel labeled 2 overall and a housing part 3 which borders it and in which a circuit arrangement is housed which includes a contact sheet pair, having an elastic contact sheet 6 and of a fixed contact sheet 7. The displacement channel 2 and the housing part 3 which accommodates the contact sheet pair 6, 7 have a common housing wall 4 which is provided with an opening 5. One part projects from the elastic contact sheet 6 and extends through the opening 5 in the common housing wall 4 into the displacement channel 2. The part which projects into the displacement channel 2 interacts with a slide 1 which when the belt lock is actuated, i.e. locked or unlocked, can be moved in the displacement channel 2 out of a first end position into a second end position and back. The belt lock is shown in position of use.

FIG. 1 shows a first circuit arrangement which is a make contact in accordance with an exemplary embodiment. The circuit arrangement 10 is a make contact, i.e. that when the part 16 projecting from the elastic contact sheet 6 interacts with the slide 1 an electrical contact is closed. The part 16 which projects from the elastic contact sheet 6 is a section of the elastic contact sheet 6 curved in an elbow shape. The elastic contact sheet 6 together with the section 16 curved in an elbow shape is dimensioned such that it largely closes the opening 5 in the common housing wall 4. In this way abraded material which may be formed when the slide 1 travels over the section 16 curved in an elbow shape does not travel into the interior of the housing part 3 which holds the contact sheet pair 6, 7 or into the contact region of the contact sheet pair 6, 7.

Figure 2:
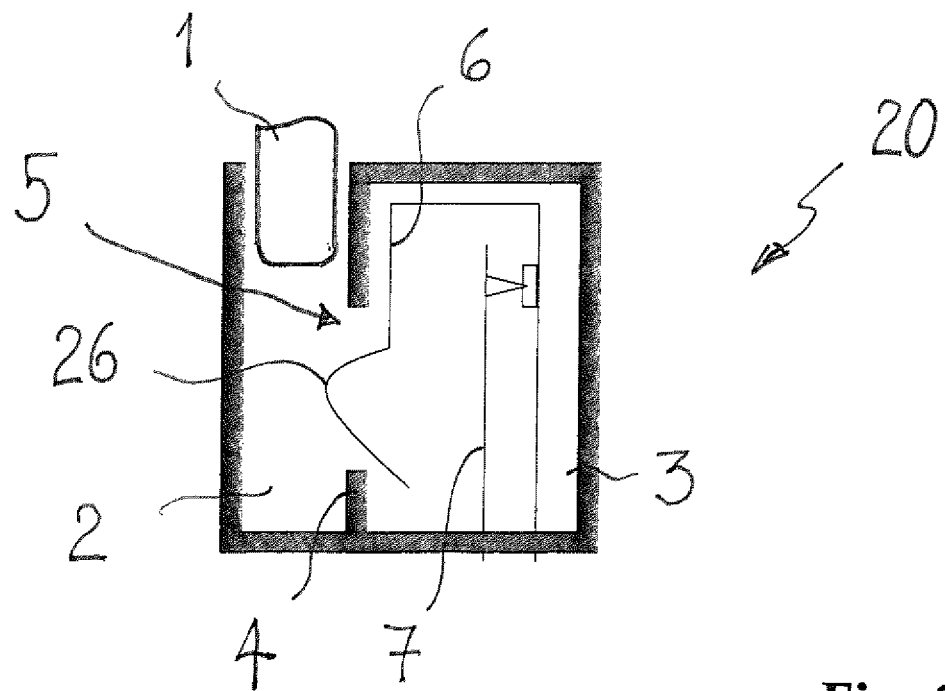
FIG. 2 shows a second circuit arrangement which is a break contact in accordance with an exemplary embodiment.

FIG. 2 shows a second circuit arrangement which is a break contact in accordance with an exemplary embodiment. The section of the elastic contact sheet 6 which is curved in an elbow shape and which projects into the displacement channel 2 is labeled 26. FIG. 2 shows a so-called break contact, i.e. when the section 26 which is curved in an elbow shape and which projects from the elastic contact sheet 6 interacts with the slide 1, an electric contact between the contact sheet pair 6, 7 is opened. The elastic contact sheet 6 together with the section 26 which is curved in an elbow shape is in turn dimensioned such that it largely closes the opening 5 in the common housing wall 4.

Figure 3:
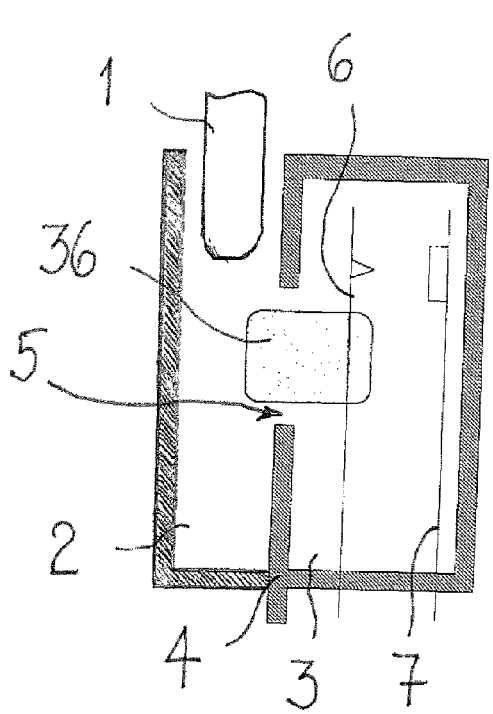
FIG. 3 shows a third circuit arrangement in accordance with an exemplary embodiment.

FIG. 3 shows a third circuit arrangement in accordance with an exemplary embodiment. In particular the illustrated circuit arrangement 30 is a make contact. The elastic contact sheet 6 is made substantially straight and extends largely parallel to the fixed contact sheet 7. The part projecting from the elastic contact sheet 6 is an actuating member 36 which is made as a plastic block and which is connected to the elastic contact sheet 6. The actuating member 36 made as a plastic block is provided with a slide coating at least on its regions interacting with the slide 1.

For example it is a teflon coating. Covering of the opening 5 in the common housing wall 4 takes place in turn by corresponding dimensioning of the elastic contact sheet 6 and/or of the actuating member 36.

Figure 4:
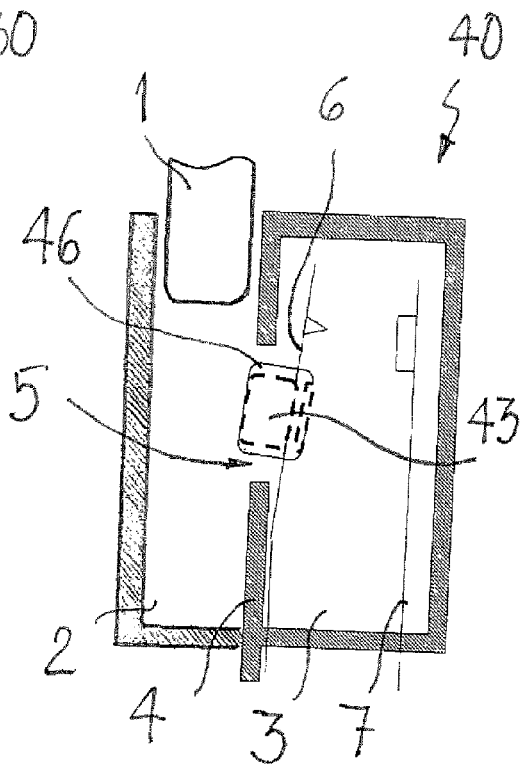
FIG. 4 shows a fourth circuit arrangement with a modified actuating member in accordance with an exemplary embodiment.

FIG. 4 shows a fourth circuit arrangement with a modified actuating member in accordance with an exemplary embodiment. As shown in FIG. 4, the actuating member 46 which is made as a plastic block can be arranged tilted in the direction of the oncoming slide 1. This can further reduce the friction between the slide 1 and the actuating member 46; this is beneficial with respect to avoiding abrasion. The actuating member 46 made as a plastic block can also, as indicated, have one or more cavities 43 in order to reduce the mass which is to be moved in the interaction between the slide 1 and the actuating member 46.

Figure 5:
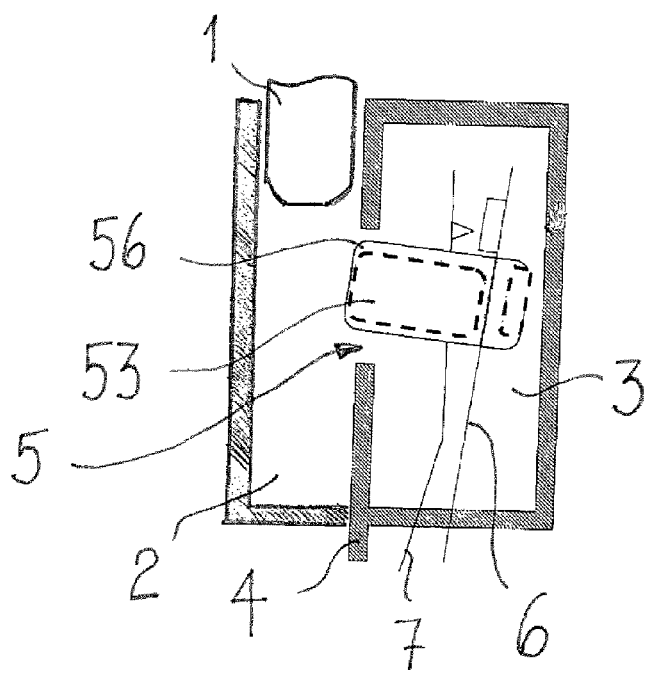
FIG. 5 shows a fifth circuit arrangement of break contact in accordance with an exemplary embodiment.

FIG. 5 shows a fifth circuit arrangement of break contact in accordance with an exemplary embodiment. As shown in FIG. 5, the actuating element which projects from the elastic contact sheet is labeled 56. It is provided with cavities 53 to reduce its mass.

Figure 6:
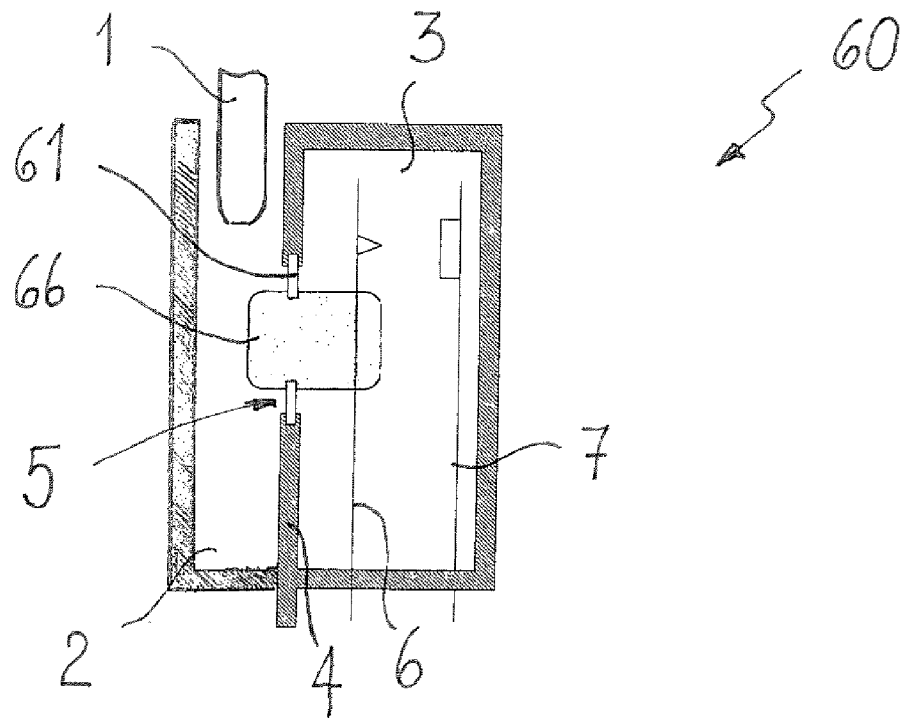
FIG. 6 shows a sixth circuit arrangement in accordance with an exemplary embodiment.

FIG. 6 shows a sixth circuit arrangement in accordance with an exemplary embodiment. As shown in FIG. 6 the circuit arrangement is labeled 60 overall and is a make contact with an actuating member 66 which is made as a plastic block, and which is connected to the elastic contact sheet 6 and which projects into the displacement channel 2. The actuating member 66 in the region of the opening 5 is embedded in an elastic membrane 61 which closes the opening 5 in the common housing wall 4. The elastic membrane 61 prevents abraded material from traveling into the contact region of the contact sheet pair 6, 7 and makes it possible to make the elastic contact sheet 6 much smaller than the opening 5 with respect to its dimensions. The plastic block which forms the actuating member 66 can in turn be made hollow to save mass.

It should be understood that the elastic contact sheet, instead of the actuating member, can also have a section which is curved in an elbow shape, which projects into the displacement channel and which is embedded in an elastic membrane in the region of the opening of the common housing wall.

Figure 7:
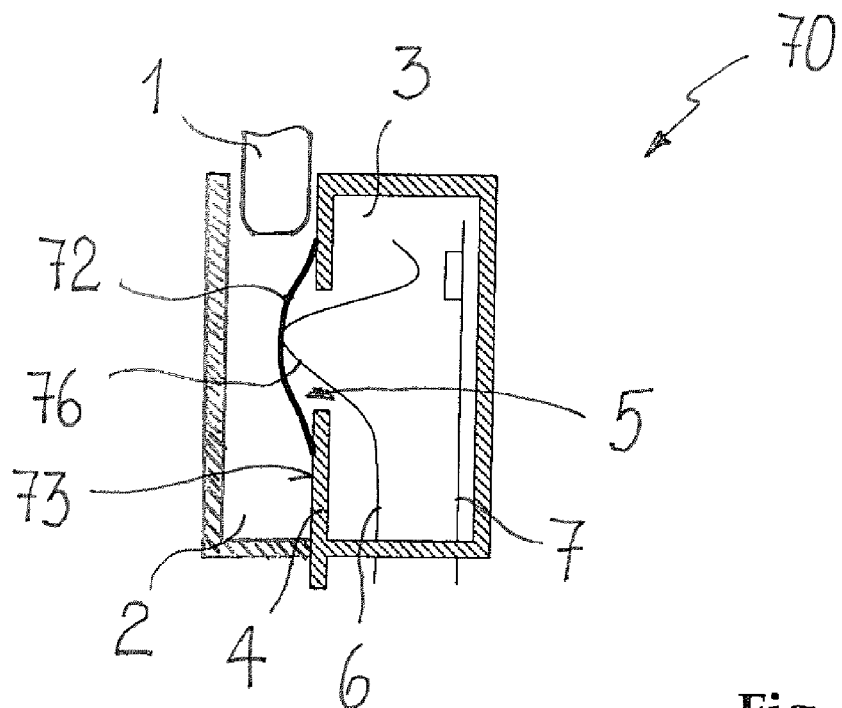
FIG. 7 shows a seventh circuit arrangement in accordance with an exemplary embodiment.

FIG. 7 shows a seventh circuit arrangement in accordance with an exemplary embodiment. As shown in FIG. 7, the elastic contact sheet 6 has a section 76 which is curved in an elbow shape and which projects into the displacement channel 2 for the slide 1. Instead of the section which is curved in an elbow shape, an actuating member could also be connected to the elastic contact sheet and project into the displacement channel. On the side 73 of the common housing wall 4 which is included in the displacement channel 2 the section 76 which is curved in an elbow shape is covered with an elastic cover membrane 72. The elastic cover membrane is attached to the side 73 of the common housing wall 4 which is included in the displacement channel 2 and covers the entire opening 5. In this way abraded material cannot travel into the bordering housing part 3 and into the contact region of the contact sheet pair 6, 7. To improve the sliding properties the elastic cover membrane 72 on its side facing the slide 1 can be provided with a slide coating, for example with a teflon coating.

Figure 8:
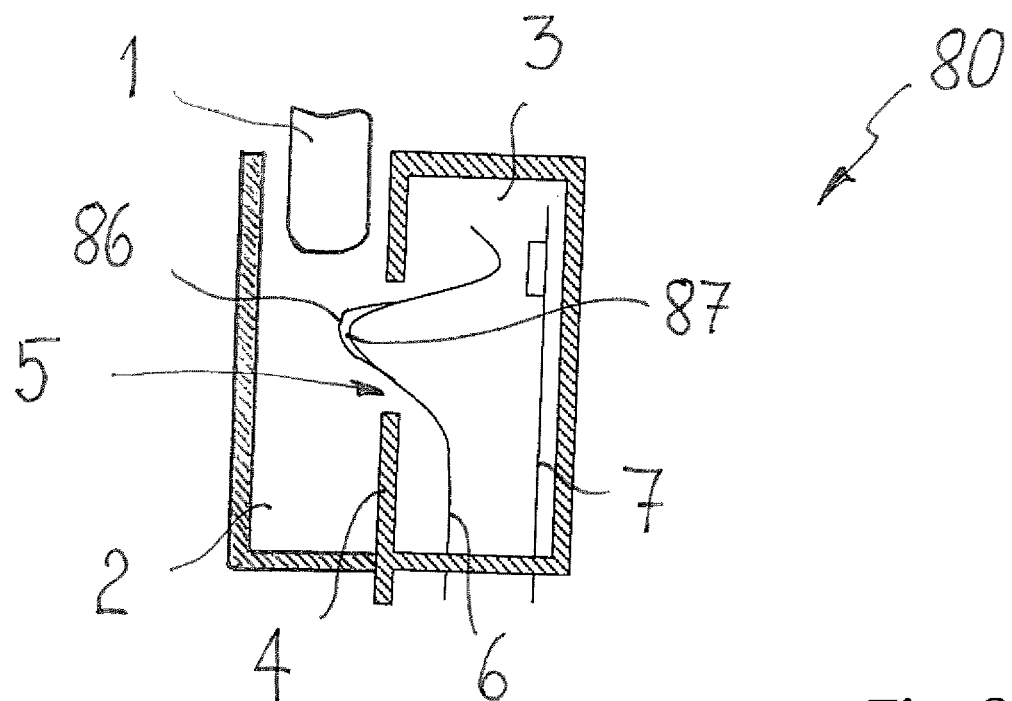
FIG. 8 shows an eighth circuit arrangement in accordance with an exemplary embodiment.

FIG. 8 shows an eighth circuit arrangement in accordance with an exemplary embodiment. FIG. 8 shows in turn an elastic contact sheet 6 with a section 86 which is curved in an elbow shape and which projects into the displacement channel 2 for the slide 1. The contact sheet 6 is dimensioned such that it largely closes the opening 5 in the common housing wall 4. In addition, the section 86 of the elastic contact sheet 6 which is curved in an elbow shape is provided with a bead 87 or dimple in its interaction region with the slide. The bead 87 is designed to contribute to abrasion being avoided in the interaction with the slide 1 or to abraded material which arises being captured in the bead 87 and being kept away from the opening 5.

Figure 9:
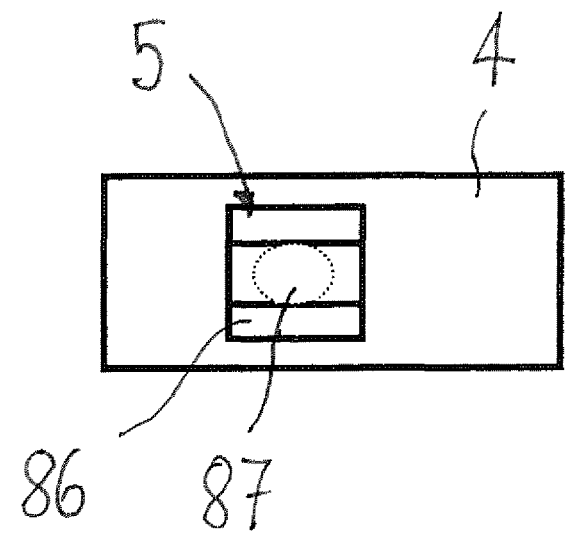
FIG. 9 shows a plan view of a common housing wall with opening in accordance with an exemplary embodiment.

FIG. 9 shows a plan view of a common housing wall with opening in accordance with an exemplary embodiment. FIG. 9 is a plan view of the side of the common housing wall 4 facing the displacement channel with the opening 5 which is largely covered by the elastic contact sheet 6 and the section 86 which is curved in an elbow shape and which projects out of the opening 5. The bead in the section 86 which is curved in an elbow shape is indicated at 87.

In another exemplary embodiment of the circuit arrangement of the present embodiment which is not shown, can be provided alternatively or cumulatively to a covering of the opening in the common housing wall by the elastic contact sheet or by a membrane, the surfaces in the displacement channel and/or in the bordering housing part and/or on the contact sheet pair or the part projecting into the displacement channel are made at least in regions as adhesive surfaces. The adhesive surfaces collect any abraded material and prevent it from traveling into the contact region of the contact sheet pair.

The circuit arrangement is used to ascertain the state of the belt lock. An electrical contact of the contact sheet pair of the circuit arrangement is opened or closed by the slide which can be moved into two end positions when the belt lock is opened or closed. The information obtained therefrom about the locking state of the belt lock can be used for example for a belt alert display by an optical and/or acoustic alert signal being generated which means to the passenger or passengers to fasten the safety belt depending on the recognized locking state of the safety belt system. Furthermore the belt lock equipped as recited in the claims that follow can also be used for activation or deactivation of mechanisms for inflating airbags for the passengers of an automobile. If there is no passenger in the vehicle, for example based on the detected locking state (open) the airbags on the passenger side are deactivated.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A circuit arrangement for a belt lock of a passenger restraint system in a motor vehicle, comprising:
   a contact sheet pair having a fixed contact sheet and an elastic contact sheet which interacts when moved with a slide which is a component of a locking mechanism located in a belt lock housing for an inserted belt tongue and when the locking mechanism is actuated can be pushed in a displacement channel from a first end position into a second end position, wherein the contact sheet pair is located in a housing part comprising a common housing wall which borders the displacement channel;

an actuating member of the elastic contact sheet, which is located at an end of the elastic contact sheet, projects through an opening in the common housing wall into the displacement channel, depending on a position of the slide, being exposed to an action of the slide in order to open or close an electrical contact between the elastic contact sheet and the fixed contact sheet to indicate a locking state of the belt lock, a covering comprising an elastic cover membrane, for completely covering the opening of the common housing wall, having surfaces which bind and hold abraded matter in at least one of the displacement channel, the housing part and the contact sheet pair; wherein the actuating member which projects into the displacement channel through the opening is covered with the elastic cover membrane on the side of the common housing wall which is included in the displacement channel;

a generator configured to generate an optical and/or acoustic alert signal to alert a passenger of the motor vehicle to fasten the belt lock based on the locking state of the belt lock, and activating or deactivating mechanisms for inflating an airbag for the passenger of the motor vehicle based on the locking state of the belt lock and a presence of the passenger, wherein the bottom surface of the housing part has a portion of the elastic contact sheet passing through it, and the bottom surface of the housing part is located across from the top surface of the housing part, an intermediate portion of the elastic contact sheet is located in between the actuating member of the elastic contact sheet and the portion of the elastic contact sheet that passes through the bottom surface of the housing part, the intermediate portion is located above the fixed contact sheet and is parallel located below the top surface of the housing part, and the portion of the elastic contact sheet extends substantially parallel to the fixed contact sheet.

2. The circuit arrangement as claimed in claim 1, wherein the actuating member which projects into the displacement channel through the opening is a section of the elastic contact sheet curved in an elbow shape.

3. The circuit arrangement as claimed in claim 1, wherein the actuating member is a plastic block which is provided with a slide coating at least in an interaction region with the slide.

4. The circuit arrangement as claimed in claim 1, wherein the elastic cover membrane is provided with a teflon coating, on its side facing the slide.

5. The circuit arrangement as claimed in claim 1, wherein the surfaces are adhesive surfaces.

6. The circuit arrangement as claimed in claim 1, wherein the actuating member which projects into the displacement channel is provided with a central flattening or bead such that in the mechanical interaction with a slide abraded matter can be minimized.

* * * * *